United States Patent [19]

Matsuno et al.

[11] Patent Number: 4,740,543

[45] Date of Patent: Apr. 26, 1988

[54] VEHICULAR INSTRUMENT PANEL POLYMER BLEND COMPOSITION

[75] Inventors: Yoshio Matsuno, Tokyo; Hidehisa Watanabe, Yokkaichi, both of Japan

[73] Assignee: Nissan Motor Co., Ltd., Yokohama, Japan

[21] Appl. No.: 894,879

[22] Filed: Aug. 8, 1986

[30] Foreign Application Priority Data

Aug. 10, 1985 [JP] Japan .................................. 60-176010

[51] Int. Cl.$^4$ ...................... C08L 23/16; C08L 51/06
[52] U.S. Cl. ...................................... 524/88; 524/209; 524/236; 524/420; 524/494; 524/504; 524/505; 525/74; 525/78; 525/194
[58] Field of Search .................... 524/505, 494, 88; 525/71, 74, 78

[56] References Cited

U.S. PATENT DOCUMENTS 4,417,019 11/1983 Yamamoto et al. ................ 524/456

Primary Examiner—Carman J. Seccuro
Attorney, Agent, or Firm—Schwartz, Jeffery, Schwaab, Mack, Blumenthal & Evans

[57] ABSTRACT

A plastic vehicular instrument panel which is excellent in impact resistance, heat resistance, fabrication efficiency and appearance. The instrument panel is formed of a plastic material comprising as main components specified crystalline propylene-ethylene block copolymer ranging from 50 to 70 weight %, specified glass fibers ranging from 20 to 30 weight %, specified ethylene-propylene copolymer rubber ranging from 15 to 20 weight %, specified pigment ranging from 2 to 5 parts by weight relative to 100 parts by weight of total of the propylene-ethylene block copolymer, the glass fiber, and the ethylene-propylene copolymer rubber.

11 Claims, No Drawings

VEHICULAR INSTRUMENT PANEL POLYMER BLEND COMPOSITION

BACKGROUND OF THE INVENTION

1. Field of the Invention

The present invention relates generally to an instrument panel for a vehicle, and more particularly to the instrument panel which is excellent in impact resistance, heat resistance, fabrication operation efficiency and appearance to meet the requirements of MVSS No. 201 and ECE No. 21.

2. Description of the Prior Art

In connection with vehicular instrument panels, there is a rapidly advanced recent trend in which the instrument panels are made of plastics such as polypropylene composite material or modified polyphenyleneether. This is because plastics are excellent from the viewpoints of strength, variety of designing, decorative design, touch, cost and the like. Of such plastics, polypropylene is particularly excellent in balance of the above viewpoints and therefore has been widely put into practice. However, instrument panels are eagerly required to be improved in quality with diversification of consumers'needs, assertion of personality, and enlarged markets. In concrete, further improvements of instrument panels are required in the areas of impact resistance, heat resistance, fabrication operation efficiency and appearance.

Hitherto, in order to provide higher heat resistance for required product characteristics for an instrument panel made of plastic material including polypropylene as a main component, it has been proposed to blend into the polypropylene plastic material a variety of inorganic fillers such as talc, mica, calcium carbonate and the like. Furthermore, many proposals have been made for producing instrument panels, in which specifying polypropylene plastic material and addition of various rubber components are made to provide higher impact resistance, and specifying polypropylene plastic material and selection of inorganic fillers are made to improve appearance and fabrication operation efficiency.

However, even with such proposals, the above-mentioned various requirements for instrument panels cannot be sufficiently met. In this regard, improvements have been made in which instrument panels are formed of polypropylene plastic material filled with fibrous fillers, particularly glass fiber. However, the thus produced instrument panels are excellent in heat resistance but lower in impact resistance and inferior in fabrication operation efficiency and appearance because of flow mark like a silver streak is formed. As a result, the instrument panels of the glass fiber-filled polypropylene plastic material have design restrictions and unavoidably require many measures such as various strength improvements and appearance improvement, resulting in a considerable increase in production cost. Otherwise, it has also been tried to form instrument panels of materials other than popypropylene plastic material, for example, modified polyphenyleneether; however, this is disadvantageous from view points of fabrication operation efficiency and production cost.

SUMMARY OF THE INVENTION

In order to solve the above-discussed problems encounted in conventional vehicular instrument panels, the present invention is to provide a vehicular instrument panel which is excellent in impact resistance, heat resistance, fabrication operation efficiency and appearance to meet the requirements of MVSS No. 201 and ECE No. 21 by fabricating into the instrument panel a plastic material comprising as main components (a) crystalline propylene-ethylene block copolymer rainging from 50 to 70 weight % and having a limiting viscosity number $[\eta]$, measured with tetraline solution at 135° C., not lower than 1.5 and a MFR ranging from 5 to 10 g/10 min., at least a part of the propylene-ethylene block copolymer being modified with a modifying agent selected from the group consisting of an unsaturated organic acid and a derivative of an unsaturated organic acid, concentration of said modifying agent ranging from 0.01 to 5 weight %; (b) glass fibers bound with a binder, ranging from 20 to 30 weight %, each glass fiber having average diameter of $10\mu$, the amount of the binder ranging from 0.10 to 0.25 weight %; (c) ethylene-propylene copolymer rubber ranging from 15 to 20 weight % and having a Mooney viscosity ML1+4(100° C.) ranging from 13 to 19; and (d) pigment ranging from 2 to 5 parts by weight relative to 100 parts by weight of total of the propylene-ethylene block copolymer, the glass fibers with the binder, and the ethylene-propylene copolymer rubber, the pigment containing pigment raw material having a Mohs' scale of hardness lower than 3.5.

DETAILED DESCRIPTION OF THE INVENTION

According to the present invention. there is provided a vehicular instrument panel comprising the following components (a)–(d):

(a) crystalline propylene-ethylene block copolymer ranging from 50 to 70 weight % and having a limiting viscosity number $[\eta]$, measured with tetraline solution at 135° C., not lower than 1.5 and a MFR ranging from 5 to 10 g/10 min., at least a part of the propylene-ethylene block copolymer being modified with a modifying agent selected from the group consisting of an unsaturated organic acid and a derivative of an unsaturated organic acid, concentration of said modifying agent ranging from 0.01 to 5 weight %;

(b) glass fibers bound with a binder, ranging from 20 to 30 weight %, each glass fiber having average diameter of $10\mu$, amount of the binder ranging from 0.10 to 0.25 weight %;

(c) ethylene-propylene copolymer rubber ranging from 15 to 20 weight % and having a Mooney viscosity ML1+4(100° C.) ranging from 13 to 19; and (d) pigment ranging from 2 to 5 parts by weight relative to 100 parts by weight of total of the propylene-ethylene block copolymer, the glass fibers with the binder, and the ethylene-propylene copolymer rubber, the pigment containing pigment raw material having a Mohs'scale of hardness lower than 3.5.

The instrument panel in this case is particularly effective for an automotive vehicle.

With respect to the component (a): The component (a) is, for example, a stereospecific block copolymer of propylene and ethylene polymerized under the action of Ziegler-Natta catalyst. It is preferable that the content of ethylene in the block copolymer is within a range of 9 to 12 mol % in a infrared absorption method. Additionally, at least a part of the block copolymer is modified with a modifying agent, for example, an unsaturated organic acid such as acrylic acid or maleic acid anhydride. or a derivative of the unsaturated organic acid. It is to be noted that a resultant instrument panel is inferior in heat resistance (thermal deformation characteristics) if the concentration of the modifying agent is less than 0.01 weight %, whereas it is inferior in strength and appearance if the concentration exceeds 5 weight %, so that the modifying agent concentration outside the range of 0.01 to 5 weight % is unsuitable. Further, if the limiting viscosity number [η] is lower than 1.5, the resultant instrument panel is inferior in impact resistance and therefore unsuitable. Furthermore, the resultant instrument panel is inferior in fabrication operation efficiency and appearance if MFR is less than 5 g/10 min., whereas it is inferior if MFR exceeds 10 g/10 min., so that MFR outside the range of 5 to 10 g/10 min.. is usuitable. The MFR represents Melt Flow Rate Which is a flow rate (g/10 min) of a resin (kept at 230° C.) flowing through a hole (diameter: 2.0955 mm, axial length: 8 mm) formed in a die under a load of 2.16 Kg. Accordingly, the MFR indicates flowability of the resin and is also called Flow Index.

With respect to the component (b): The component (b) is glass fibers prepared for blending with plastics, in which the average diameter of each glass fiber and the amount of the binder applied to the glass fibers are adjusted. The binder is applied to the surface of the glass fibers for the purpose of binding the glass fibers and providing compatibility or affinity between the plastic and the glass fibers. Although the production method of the glass fibers is no specified, the glass fibers are usually prepared by melting raw ore of glass in a bushing furnace and thereafter by extruding the molten glass ore through nozzles thus forming it into the shape of fibers. The thus prepared glass fibers are bound with the binder, which is called chopped strand. It is to be noted that the resultant instrument panel is inferior in heat resistance (thermal deformation characteristics) if the average diameter (throughout the length) of each glass fiber exceeds 10μ, so that glass fiber average diameter larger than 10μ is unsuitable. It is also noted that kneading operation efficiency is inferior if the applied amount of the binder is less than 0.10 weight %, whereas the resultant instrument panel is inferior if the applied amount exceeds 0.25 weight %, so that the binder applied amount ouside the range of 0.10 to 0.25 weight % is unsuitable. The binder applied amount in this case is obtained as weight loss on heading at 600° C. for 60 minutes.

With respect to the component (c): The component (c) is rubber prepared by copolymerizing ethylene and propylene, and preferably has a crystallinity not higher than 20% and is in the shape of pellets for the purpose of obtaining better kneading operation efficiency. It is preferable that the ethylene-propylene copolymer rubber has a weight composition ratio between ethylene and propylene which is within a range of 0.72:0.25 to 0.75:028, in which the resultant instrument panel is inferior in impact resistance if the weight composition ratio is outside the above-mentioned range. It is to be noted that the resultant instrument panel is inferior in impact resistance if the Mooney viscosity ML1+4(100° C.) of the ethylene-propylene copolymer rubber is lower than 13, whereas it is inferior in appearance and fabrication operation efficiency if the Mooney viscosity exceeds 19, so that a Mooney viscosity outside the range of 13 to 19 is unsuitable. Additionally, it is preferable that the ethylene-propylene copolymer rubber has a MFR (230° C., 2.16 Kg) ranging from 4 to 6 g/10 min.

With respect to the component (d): The component (d) is pigment prepared by blending pigment raw material to adjust colour which pigment raw material is lower than a predetermined value in hardness expressed by Mohs' scale of hardness. It is to be noted the pigment in this case includes the component of dispersing agent for the pigment raw material. In this connection, such pigment usually contains 10 weight % of the dispersing agent. The pigment raw material may be inorganic or organic. It is to be noted that if Mohs' scale of hardness of the pigment raw material exceeds 3.5, the resultant instrument panel is inferior in impact resistance and heat resistance (thermal deformation characteristics), so that the pigment raw material having the Mohs' scale of hardness not lower than 3.5 is suitable to be used for the pigment. Examples of pigment raw material having Mohs' scale of hardness not lower than 3.5 are black iron oxide red iron oxide, titanium oxide, white carbon, and yellow iron oxide. Examples of the pigment raw material having Mohs' scale of hardness lower than 3.5 are zinc sulfide, quinacridone red, benzidine yellow, isoindolenone yellow, aniline black, carbon black, phthalocyanine blue.

In the composition including the above-discussed components (a), (b), (c) and (d) as main components, blending or content ratio among the components (a), (b), (c) and (d) should be as follows:

The component (a): 50 to 70 weight % relative to the total of the components (a), (b) and (c):

The component (b): 20 to 30 weight % relative to the total of the components (a), (b) and (c);

The component (c): 15 to 20 weight % relative to the total of the components (a), (b) and (c): and The component (c): 2 to 5 parts by weight relative to 100 parts by weight of the total of the components (a), (b) and (c).

The above blending ratio of the components (a) to (b) is determined for the following reasons: The resultant instrument panel is inferior in fabrication operation efficiency and appearance if the content of component (a) is less than 50 weight % (as mentioned above), and inferior in impact resistance and heat resistance (thermal deformation characteristics) if the content exceeds 70 weight %, so that the component (a) content outside the range of 50 to 70 weight % is unsuitable.

Further, the resultant instrument panel is inferior in heat resistance (thermal deformation characteristics) if the content of the component (b) is less than 20 weight %, and inferior in fabrication operation efficiency and appearance if the content exceeds 30 weight %, so that the component (b) content outside the range of 20 to 30 weight % is unsuitable.

Furthermore, the resultant instrument panel is inferior in impact resistance if the content of the component (c) is less than 15 weight %, and inferior in shape, appearance. scratch resistance if the content exceeds 20 weight %, so that the component (c) content outside the range of 15 to 20 weight % is unsuitable.

Moreover. the resultant instrument panel is inferior in design characteristics such as colouring, feeling, appearance and scratch resistance if the content of the component (d) is less than 2 parts by weight as mentioned above, and inferior in impact resistance, heat resistance (heat deformation characteristics), durability and economical efficiency if the component (d) content exceeds 5 parts by weight, so that the component (d) content outside the range of 2 to 5 parts by weight is unsuitable.

It will be understood that at least one selected from oxidation inhibitor, processing stabilizer, lubricant, nuclear agent, light stabilizer, antistatic additive, copper inhibitor, neutralizer, foaming agent, plasticizer, flame retarder. cross-linking agent, and dispersant may be added, as occasion demands, to the above-mentioned composition used as the raw material of the instrument panel according to the present invention which composition includes components (a) to (d).

The preparation of the composition as the raw material of the instrument panel is made by blending uniformly the above-mentioned components (a) to (d) and additives (added as occasion demands) in a mixer such as a henshel or a tumbler, and thereafter by kneading and pellet-forming upon using a usual extruder for plastic material. In this preparation process, all the components (a) to (d) and the additives are not necessarily mixed simultaneously. so that a part of all the components and additives may be previously mixed and thereafter the remaining part is mixed. The thus obtained pellets of the composition are formed into a desired shape by injection moulding which is usually used in the field of plastic fabrication for polypropylene. In this connection, other plastic fabrication methods such as blow moulding, compression moulding, vacuum forming and rotational moulding are unsuitable for fabrication of the above-mentioned composition of the raw material of the instrument panel because they are disadvantageous from the viewpoints of fabrication operation efficiency, fabrication cost, and restrictions in the design of the instrument panel. Accordingly, plastic fabrication methods other than the injection moulding are unsuitable for the instrument panel of the present invention. It is preferable that the injection moulding is carried out under conditions where moulding temperature is within a range of from 180° to 280° C. and injection pressure is within a range of from 300 to 1,500 Kg/cm$^2$.

The present invention will be discussed further in detail with reference to Examples.

Evaluation of a variety of Examples was made by the following test methods:

(1) Physical Properties of Specimen (1-1) Flexural Elastic Modulus

This was measured according to JIS (Japanese Industrial Standard) K 7203, in which atmospheric temperature was 23° C.

(1-2) Dart Impact Resistance

A dart as a load sensor was dropped (2 m×4 Kgf) onto a specimen (diameter: 100 mm, thickness: 2 mm) mounted on a support (hole diameter: 40 mm). Then, the deformation and breakdown behavior of the specimen under the impact load of the dart was measured, in which the impact energy absorbed before a crack production point in the obtained impact pattern was measured thereby obtaining an impact resistance. In this test. atmospheric temperature was 23° C.

(2) Instrument Panel Practical Physical Properties (2-1)Fabrication Operation Efficiency Actual fabrication operation (injection moulding) of sample plastic material was carried out by using an inline injection moulding machine M-3000-DM made by Meiki Co., Ltd. in Japan and using metallic dies presently used for producing instrument panels whose raw material is conventional polypropylene composite material (comosite material in which talc is mixed to polypropylene). Upon the actual fabrication operation, the fabrication efficiency was judged by observing the degree of filling of molten sample plastic material into the metallic dies. In practice, a technical study was made by using three kinds of dies and three kinds of injection machines for this test, in which the same result was obtained for each sample of plastic material.

(2-2) Heat Resistance (Thermal Deformation Characteristics)

Sample instrument panel moulded in the metallic dies mentioned at (2-1) was installed to a cut-model of a vehicle together with load parts such as a radio and put in a high temperature experimental chamber to be maintained at a high temperature of 115° C. (raised from at ordinary temperature 23°) for 4 hours, in which size change of sampel instrument panel was measured, and thermal deformation of the sample instrument panel was observed upon applying a 10 Kg load to various portions of the sample instrument panel. In this test, evaluation of thermal deformation was made by measuring the thermal deformation of a front end section (width: 1400 mm) of the sample instrument panel after the sample instrument panel was heated for 4 hours under a condition where atmospheric temperature was from 85° to 92° C., and the surface temperature of the sample instrument panel (black) is 115° C., in which evaluation was made as 'A (excellent)' when the thermal deformation is $\leq 1.5$ mm relative to a standard value, and 'D (no good)' when the thermal deformation was $>1.5$ mm relative to the standard value.

(2-3) Impact Resistance

Impact according to the test conditions of MVSS No. 201 and ECE No. 21 was applied to a sample instrument panel installed to the above-mentioned cut-model, in which generated G was measured and the surface of breakdown was observed thereby to determine acceptance or rejection. More specifically, a determination was made as to whether or not the test result met the following requirements: (a) generated deceleration of not less than 80 G, and duration of less than 3 mmS; and (2) a formation of a sharp edge at the location of the impact, in which the test result was judged 'A (excellent)' if the requirements were met; the test result was judged 'B (good)' if the requirements were partly or slightly met; and the test result was judged 'D (no good)' if the requirements could not be met.

(2-4) Appearance

Visual examination was made for surface appearance of sample instrument panel which was injection-moulded upon using the above-mentioned metallic dies and the injection moulding machine, in which judgement was made as to whether or not the moulded sample instrument panel could be practically used.

EXAMPLES

Various kinds of each component (a), (b), (c) and (d) listed below where blended to prepare a variety of sample plastic materials of Sample Nos. 1 to 13 shown in Tables 4A and 4B.

The above-mentioned component (a): Propylene-ethylene block copolymers A1, A2, A3, A4 and A5 as shown in Table 1.

TABLE 1

|  | A1 | A2 | A3 | A4 | A5 |
| --- | --- | --- | --- | --- | --- |
| MFR (g/min) | 10 | 10 | 3 | 5 | 20 |
| Limiting Viscosity Number [η] (Tetralin 135° C.) | 2.0 | 2.0 | 2.7 | 2.5 | 1.4 |
| Modifying Agent | acrylic acid | maleic acid anhydride | acrylic acid | — | acrylic acid |
| Concentration (weight %) of Modifying Agent | 0.3 | 0.3 | 0.3 | — | 0.3 |

The above-mentioned component (b): Glass fibers B1, B2 and B3 as shown in Table 2.

TABLE 2

|  | B1 | B2 | B3 |
| --- | --- | --- | --- |
| Average Diameter (μ) | 9 | 6 | 12 |
| Binder Amount (weight %) | 0.2 | 0.1 | 0.5 |

The above-mentioned component (c): Ethylene-propylene copolymer rubbers C1, C2 and C3.

TABLE 3

|  | C1 | C2 | C3 |
| --- | --- | --- | --- |
| Mooney Viscosity | 16 | 19 | 23 |

The above-mentioned component (d): Pigments D1, D2, D3 and D4 described hereinafter.

D1: Blackish grey pigment which was adjusted in colour by using as a major ingredient aniline black having a Mohs' scale of hardness lower than 3.5. The component D1 did not contain ingredient having a Mohs' scale of hardness not lower than 3.5. Magnesium stearate was used as dispersing agent as in the below-described components D2 to D4.

D2: Light brown pigment which was adjusted in colour by using a major ingredient benzidine yellow having a Mohs' scale of hardness lower than 3.5. The component D2 did not contain ingredient having a Mohs' scale of hardness not lower than 3.5.

D3: Light grey pigment which was adjusted in color by using as a major ingredient titanium oxide having Moh's scale of hardness not lower than 3.5. Additionally, a slight amount of carbon black having a Mohs' scale of hardness was contained.

D4: Brown pigment which was adjusted in colour by using as major ingredients black iron oxide and red iron oxide. The component D4 did not contain ingredient lower than 3.5.

The above-mentioned components (a) to (d) were used in the various combinations and in the various blending proportions as shown in Tables 4A and 4B thereby to prepare a variety of blended samples of Sample Nos. 1 to 13, in which phenol oxidation inhibitor, sulfur oxidation inhibitor, antistatic additive and light stabilizer were additionally blended in total amount of 0.9 part by weight. The thus prepared blended sample was kneaded and formed into pellets at 220° C. by using a bent-provided screw extruder (having a single shaft having a diameter of 65 mm), thus obtaining coloured pellets. The thus obtained coloured pellets were formed into specimens for measuring the flexible elastic modulus and the dart impact resistance by using an inline injection moulding machine (SJ 45C) made by Meiki Co., Ltd. The result of measurement of flexible elastic modulus and dart impact resistance was shown in Table 4B.

With respect to products or the sample instrument panels: The above-mentioned pellets were formed by using the above-mentioned metallic dies and injection moulding machine into the products or sample instrument panels whose fabrication operation efficiency and other practical characteristics were thereafter evaluated under the tests (2-1) to (2-4). The result of evaluation is shown in Table 4B.

As shown in Table 4B, the specimens prepared by using the blended samples of Sample Nos. 1 to 4 exhibit a good balance of physical properties. Additionally, the sample instrument panels prepared by using the same blended samples also exhibit sufficient impact resistance, heat resistance (thermal deformation characteristics) and fabrication operation efficiency to meet MVSS No. 201 and ECE No. 21.

On the contrary, the specimens prepared by using the blended samples of Sample No. 5 to 13 are low in level of physical properties. Besides, the sample instrument panels prepared by the same blended samples are also low in practical characteristics.

In this connection, an example of the instrument panel according to the present invention has a specific gravity ranging from 1.06 to 1.07, a flexural elastic modulus of 35,000 Kg/cm$^2$, an Izod impact value of 26, and a thermal deformation temperature of 135° C.

TABLE 4A

| | Blending Proportion | | | | | | | |
| --- | --- | --- | --- | --- | --- | --- | --- | --- |
| | (a) Propylene-Ethylene Block Copolymer | | (b) Glass Fibers | | (c) Ethylene-Propylene Copolymer Rubber | | (d) Pigment | |
| Sample No. | Variety | Weight % relative to (a) + (b) + (c) | Variety | Weight % relative to (a) + (b) + (c) | Variety | Weight % relative to (a) + (b) + (c) | Variety | Weight % relative to (a) + (b) + (c) |
| 1 | A1 | 65 | B1 | 20 | C1 | 15 | D1 | 3 |
| 2 | A1 | 50 | B1 | 30 | C1 | 20 | D2 | 3 |
| 3 | A1 | 65 | B2 | 20 | C1 | 15 | D1 | 5 |
| 4 | A2 | 60 | B1 | 22 | C2 | 18 | D1 | 2 |
| 5 | A3 | 65 | B1 | 20 | C1 | 15 | D1 | 3 |
| 6 | A4 | 65 | B1 | 20 | C1 | 15 | D1 | 3 |
| 7 | A5 | 65 | B1 | 20 | C1 | 15 | D1 | 3 |
| 8 | A1 | 65 | B3 | 20 | C1 | 15 | D1 | 3 |
| 9 | A1 | 65 | B1 | 20 | C1 | 15 | D3 | 3 |
| 10 | A1 | 65 | B1 | 20 | C3 | 15 | D4 | 3 |
| 11 | A1 | 75 | B1 | 15 | C1 | 10 | D1 | 3 |

TABLE 4A-continued

| | Blending Proportion | | | | | | | |
|---|---|---|---|---|---|---|---|---|
| | (a) Propylene-Ethylene Block Copolymer | | (b) Glass Fibers | | (c) Ethylene-Propylene Copolymer Rubber | | (d) Pigment | |
| Sample No. | Variety | Weight % relative to (a) + (b) + (c) | Variety | Weight % relative to (a) + (b) + (c) | Variety | Weight % relative to (a) + (b) + (c) | Variety | Weight % relative to (a) + (b) + (c) |
| 12 | A1 | 35 | B1 | 40 | C1 | 25 | D1 | 3 |
| 13 | A2 | 60 | B1 | 22 | C3 | 18 | D1 | 2 |

TABLE 4B

| | Test Result | | | | | |
|---|---|---|---|---|---|---|
| | Specimen Physical Property | | Instrument Panel Practical Characteristics | | | |
| Sample No. | Flexural Elastic Modulus (kg/cm2) | Dart Impact Resistance (kg · cm) | *1 Fabrication Operation Efficiency (Flow Characteristics) | Heat Resistance (Thermal Deformation Characteristics) | Impact Resistance | *2 Appearance |
| 1 | 29,000 | 25 | B | A | B | B |
| 2 | 35,000 | 35 | B | A | A | B |
| 3 | 31,000 | 28 | B | A | B | B |
| 4 | 30,600 | 27 | B | A | B | B |
| 5 | 28,600 | 26 | D | — | — | D |
| 6 | 18,000 | 22 | B | D | — | B |
| 7 | 29,300 | 19 | A | A | D | A |
| 8 | 20,000 | 23 | B | D | B | D |
| 9 | 21,000 | 15 | B | D | D | B |
| 10 | 20,200 | 14 | D | D | D | B |
| 11 | 26,200 | 20 | B | D | D | B |
| 12 | 37,400 | 39 | D | — | — | D |
| 13 | 30,400 | 24 | C | A | D | D |

*1 A: Excellent B: Good C: Filling Unstable D: Filling Failed
*2 A: Beautiful B: Good D: No Good

What is claimed is:

1. A vehicular instrument panel comprising:
   (a) crystalline propylene-ethylene block copolymer ranging 50 to 70 weight % and having a limiting viscosity number [η], measured with tetraline solution at 135° C. not lower than 1.5 and a MFR ranging from 5 to 10 g/10 min., at least a part of said propylene-ethylene block copolymer being modified with a modifying agent selected from the group consisting of an unsaturated organic acid and a derivative of an unsaturated organic acid, concentration of said modifying agent ranging from 0.01 to 5 weight %;
   (b) glass fibers bound with a binder, ranging from 20 to 30 weight %, each glass fiber having average diameter of 10μ, amount of said binder ranging from 0.10 to 0.25 weight %;
   (c) ethylene-propylene copolymer rubber ranging from 15 to 20 weight % and having a Mooney viscosity ML1+4(100° C.) ranging from 13 to 19; and
   (d) pigment ranging from 2 to 5 parts by weight relative to 100 parts by weight of total of said propylene-ethylene block copolymer, said glass fibers with said binder, and said ethylene-propylene copolymer rubber, said pigment containing pigment raw material having a Mohs' scale of hardness less than 3.5.

2. A vehicular instrument panel as claimed in claim 1, wherein said crystalline propylene-ethylene block copolymer is a stereospecific copolymer.

3. A vehicular instrument panel as claimed in claim 1, wherein said crystalline propylene-ethylene block copolymer is copolymerized with Ziegler-Natta catalyst.

4. A vehicular instrument panel as claimed in claim 1, wherein said modifying agent is one selected from the group consisting of acrylic acid and maleic acid anhydride.

5. A vehicular instrument panel as claimed in claim 1, wherein said ethylene-propylene copolymer rubber has a crystallinity not higher than 20%.

6. A vehicular instrument panel as claimed in claim 1, wherein said ethylene-propylene copolymer rubber has a weight ratio of ethylene and propylene. ranging from 0.72:0.25 to 0.75:0.28.

7. A vehicular instrument panel as claimed in claim 1, wherein said ethylene-propylene rubber has a MFR ranging from 4 to 6 g/10 min.

8. A vehicular instrument panel as claimed in claim 1, wherein said pigment raw material is at least one selected from the group consisting of zinc sulfide, quinacridone red, benzidine yellow, isoindolenone yellow, aniline black, carbon black, and phthalocyanine blue.

9. A vehicular instrument panel as claimed in claim 1, further comprising at least one selected from the group consisting of oxidation inhibitor, processing stabilizer, lubricant, light stabilizer, antistatic additive, copper inhibitor, neutralizer, forming agent, plasticizer, flame retarder. cross-linking agent. and dispersant.

10. A vehicular instrument panel as claimed in claim 1, wherein said instrument panel is produced by injection moulding.

11. A vehicular instrument panel as claimed in claim 10, wherein said injection moulding is carried out at a temperature ranging from 180° to 280° C. and at an injection pressure ranging from 300 to 1,500 Kg/cm2.

* * * * *